United States Patent [19]

Bell, Jr. et al.

[11] 4,078,163
[45] Mar. 7, 1978

[54] PROGRAMMABLE CURRENT CONTROL SYSTEM FOR WIRE ELECTRODE ELECTRICAL DISCHARGE MACHINING APPARATUS

[76] Inventors: Oliver A. Bell, Jr., 654 Heatherly Rd., Mooresville, N.C. 28115; Randall C. Gilleland, Rt. No. 7, Box 418, Statesville, N.C. 28677

[21] Appl. No.: 583,794

[22] Filed: Jun. 4, 1975

[51] Int. Cl.² .............................................. B23P 1/08
[52] U.S. Cl. .............................. 219/69 C; 219/69 W; 364/474
[58] Field of Search ............... 219/69 C, 69 W, 69 P, 219/69 M; 235/151.1, 151.11, 151.3

[56] References Cited

U.S. PATENT DOCUMENTS

| | | | |
|---|---|---|---|
| 3,614,368 | 10/1971 | Lobur | 219/69 D |
| 3,632,942 | 1/1972 | Kondo | 219/69 C |
| 3,697,879 | 10/1972 | Holliday | 219/69 C |
| 3,731,045 | 5/1973 | Ullmann et al. | 219/69 W |
| 3,790,910 | 2/1974 | McCormack | 235/151.3 |
| 3,809,847 | 5/1974 | Bell | 219/69 C |
| 3,809,848 | 5/1974 | Bell | 219/69 C |
| 3,855,443 | 12/1974 | Bell et al. | 219/69 G |

OTHER PUBLICATIONS

Nosov & Byron, Working Metals by Electro-Sparking, 1956, pp. 10, 11.

Primary Examiner—Bruce A. Reynolds

[57] ABSTRACT

The system includes data input means for information relative to the material of the workpiece and the thickness of the workpiece. A read-only memory then provides information to a programmable counter so that off-time for the machining power pulses is appropriately provided for. In addition, there is manual preset means for setting the off-time to be provided during gap short circuit condition. An appropriate cut-off sensing circuit is operatively connected to the gap for sensing short circuit condition and initiating the pulse reduction but only for the duration of the gap short circuit condition.

9 Claims, 4 Drawing Figures

PROGRAMMABLE CURRENT CONTROL SYSTEM FOR WIRE ELECTRODE ELECTRICAL DISCHARGE MACHINING APPARATUS

REFERENCE TO RELATED PATENTS

This invention is related to our earlier U.S. Pat. No. 3,855,443 issued on Dec. 17, 1974 for "Gap Sensing Circuit for Electrical Discharge Machining Apparatus" and to Oliver A. Bell, Jr.; U.S. Pat. No. 3,809,847 issued on May 7, 1974 for "Method and Apparatus for Electrical Discharge Machining", both of which patents are of common ownership herewith. The first mentioned patent relates to a gap short circuit protection system in which there is included a divide-by-ten stage for providing the control of a series of power pulses responsive to gap short circuit condition. The second patent describes and discloses a digitally controlled electrical discharge machining pulse generator including an on-time counter and an off-time counter.

BACKGROUND OF THE INVENTION

The present invention relates to a combined on-off time control and short circuit control system for a wire feed electrical discharge machining apparatus. Such apparatus employs a precisely driven and guided wire electrode for generating very small radii in intricate shapes. Because of the nature of the wire cutting operation, there are limitations to the relative movement between the wire electrode and workpiece that can be employed to break gap short circuit conditions. In conventional cavity sinking electrical discharge machining where the tool electrode is mounted on a vertical head, there are a variety of expedients used to prevent and to interrupt the formation of gap short circuit, for example by fast back-up for the head and electrode when gap short circuit occurs and also by vibration of the workpiece and/or electrode during machining to flush the gap and to further inhibit the gap short circuit condition.

The present invention as it relates to the gap short circuit part of the power supply used with a wire cutter includes provision for precisely controllable on-time, off-time and current magnitude. It will be understood that the workpiece carrying tables on a typical two-axis contouring wire cutter electrical discharge machining machine, such as are shown in FIGS. 1, 2 and 3 of the drawings, would be capable of performing both straight line motion and continuous path contouring. Any of a number of commercial numerical tape control units are available for providing this type of operation. One example of such a control unit is the numerical tape control unit manufactured and sold by the Superior Electric Company of Bristol, Connecticut.

The invention of Applicants is particularly adapted for use with wire cutting electrical discharge machining and it takes into account the factors of thickness of the workpiece and material of the workpiece, which are important factors in determining the optimum on-off time ratio and the level to which the machining current will be reduced. This reduction is controlled through the pulse output of the off-time generator and to the short circuit control system which actually controls the machining power pulse off-time.

BRIEF DESCRIPTION OF THE DRAWINGS

The present invention will be described in the appended drawings with like numerals being assigned to like parts as they may appear throughout the several views, and in which.

DETAILED DESCRIPTION OF THE PREFERRED EMBODIMENT

Figure 1:
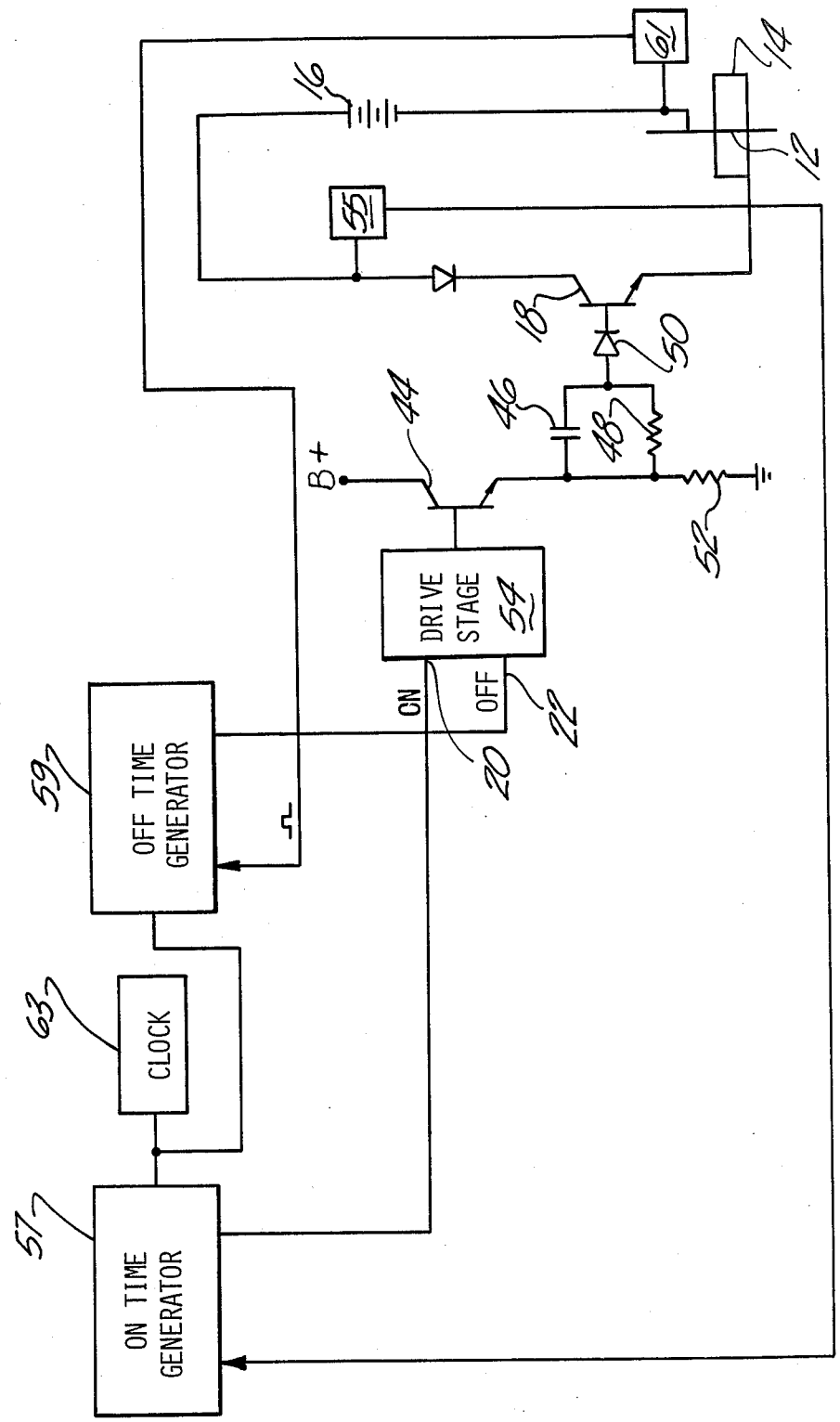
FIG. 1 is a partial schematic, block diagrammatic showing of an electrical discharge machining power supply suitable for incorporating the present invention.

With more particular reference to FIG. 1, there are shown the basic elements of a wire cutting electrical discharge machining system including the wire electrode 12 and the workpiece 14. A main DC power source 16 is shown with its negative terminal connected to the wire electrode 12 for cutting. An electronic output switch is embodied as an NPN transistor 18. It will be understood that the transistor 18 may be either a single transistor of high current capability or a number of transistors connected in parallel in an output transistor bank. Transistor 18 is turned on and off in precisely controlled operation through the on-off control pulses at the two left hand input terminals 20 and 22 for the drive stage 54. The output transistor switch 18 is turned on and off through the operation of a prior stage drive transistor 44 and through a parallel RC network including a capacitor 46 and a resistor 48 and through a base connected series diode 50. The transistor 44 further has a load resistor 52 connected in series with its emitter.

One or more intermediate drive stages 54 may be included in the power supply circuit to provide for the necessary pulse shaping and amplification of the control input signals received at the input terminals 20 and 22. The actual machining power pulse on-off times are determined by the triggering pulses received at the on and off terminals 20, 22. A start pulse may be derived from the power circuit through a gap breakdown sensing circuit 55 to initiate the operation of the on-time generator 57 in the manner shown in FIG. 1 of the aforementioned U.S. Pat. No. 3,809,847. The description of the operation of the on-time generator and the associated clock pulse source is given in column 2, line 57 through column 4, line 47 of the aforesaid U.S. Pat. No. 3,809,847. The off-time is controlled through a separate off-time generator 59. The off-time generator 59 with the inclusion of the short circuit protection system is adapted to receive a cut-off signal from a cut-off sensing network 61 connected to the gap. The complete detail of the off-time generator 59 and of the manner in which the short circuit cut-off sensing network 61 controls its operation will be better shown in FIG. 4 hereinafter. To provide for the operation of the on-time generator 57 and the off-time generator 59, a suitable clock pulse source 63 is provided.

Figure 2:
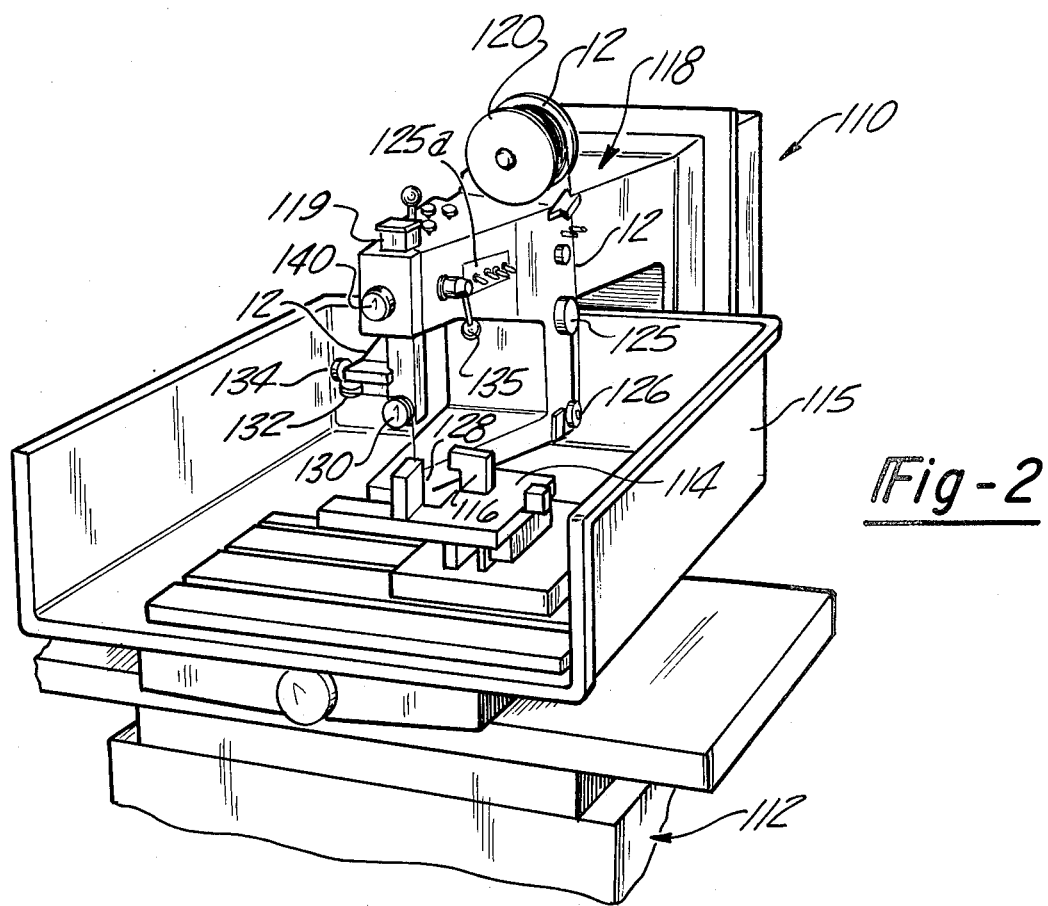
FIG. 2 is a partial front perspective view of a machine tool for wire cutting electrical discharge machining.
Figure 3:
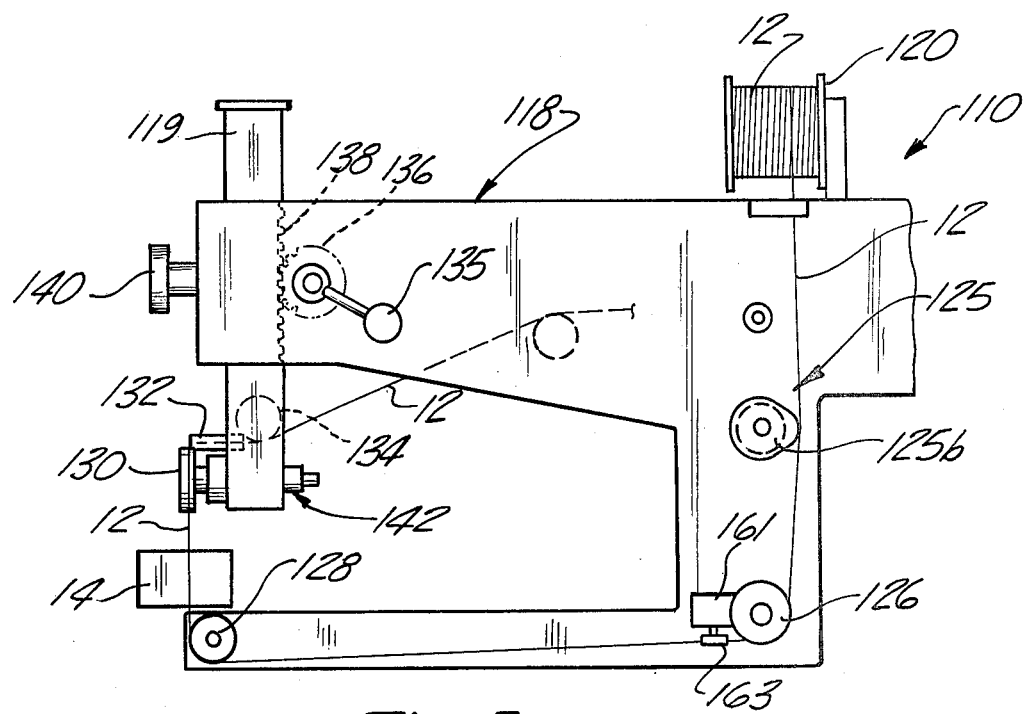
FIG. 3 is a right side elevational view of the head of the machine tool of FIG. 2.

Reference is made to FIGS. 2 and 3 which illustrate the essential parts of the wire cutting electrical discharge machining machine tool 110. The machine tool 110 includes a base 112 which typically has built into it a dielectric reservoir and dielectric temperature control unit for handling the dielectric fluid used in the electrical discharge machining operation. The dielectric fluid may be either a deionized water supply or, alternately, kerosene or a like light cutting oil. During the cutting operation, a stream of dielectric fluid is continuously directed at the electrode wire 12 and at the workpiece 14 to maintain flow through the cutting gap from either or both the upper and lower directions. A precision work table 114 is included in the machine tool 110. The table 114 typically has a programmable table travel along both the X and Y axis. The system for driving the table 114 generally includes a pair of precision preloaded ball bearing lead screws for eliminating backlash. A work pan 115 encloses the work area to contain the dielectric fluid. The table 114 also includes a work holding fixture 116 which is preferably quick clamping and capable of fastening workpieces of various sizes securely in place. The machine column is indicated generally by the numeral 118 and includes a height adjustable head 119 which is adjustable through an associated precision rack and gear arrangement to bring the wire guide system close to the workpiece 14 to help maintain accuracy.

The wire electrode system further includes a supply reel 120 from which is unwound the wire electrode 12. The electrode 12, while it is illustrated as being of a wire configuration, may alternately be a band electrode with minor and obvious changes to be made in the configuration of the associated guide and drive rollers. Guide rollers 126, 128, 130, 132 and 134 are included in the system as shown in FIGS. 2 and 3 to move the electrode 12 through its cutting path. This system further includes a variable tension brake 125 with a tension adjust system including switches 125a. The constant tension is maintained in the wire electrode 12 by the brake 125. The brake 125 is of the adjustable torque, permanent magnet type and movement of the switches 125a causes tension adjustment, for example, in a range from 0.1 to 8.0 ounces by varying the magnetic flux. In the interest of brevity and simplification, the full detail of the brake 125 is not shown.

FIG. 3 shows in greater detail the arrangement of the wire 12 relative to the tension brake 125. The wire 12 is wound with two turns clockwise or counterclockwise about the capstan 125b of the tension brake 125. At the forward end of the head 118, the electrode 12 takes an upward path abut the periphery of the roller 130. It is significant that rollers 128 and 130 have their axes of rotation orthogonal one to the other. This serves to greatly improve the alignment accuracy which may be made in the vertical plane for that portion of the electrode 12 which is maintained in cutting proximity to the workpiece 14. The workpiece 14 is shown in the position in which it would be maintained and supported by the table 114.

The electrode 12 next passes about the roller 132, which again has an axis of rotation orthogonal relative to the axis of rotation of the roller 130. Also shown in FIG. 3 is the lever 135 which through a precision rack and gear assembly, including a pinion gear 136 and rack 138, is used to provide vertical adjustment of the head assembly 119. A locking screw 140 is included to hold the head assembly 119 securely in place after the height adjustment has been made. Also shown in FIG. 3 is a portion of the spindle assembly 142 which is used to provide and allow for adjustment of the roller 130 along the Y axis. A further spindle, not shown, is included that is cooperative with the roller 128 to provide for its adjustability along the X axis.

Figure 4:
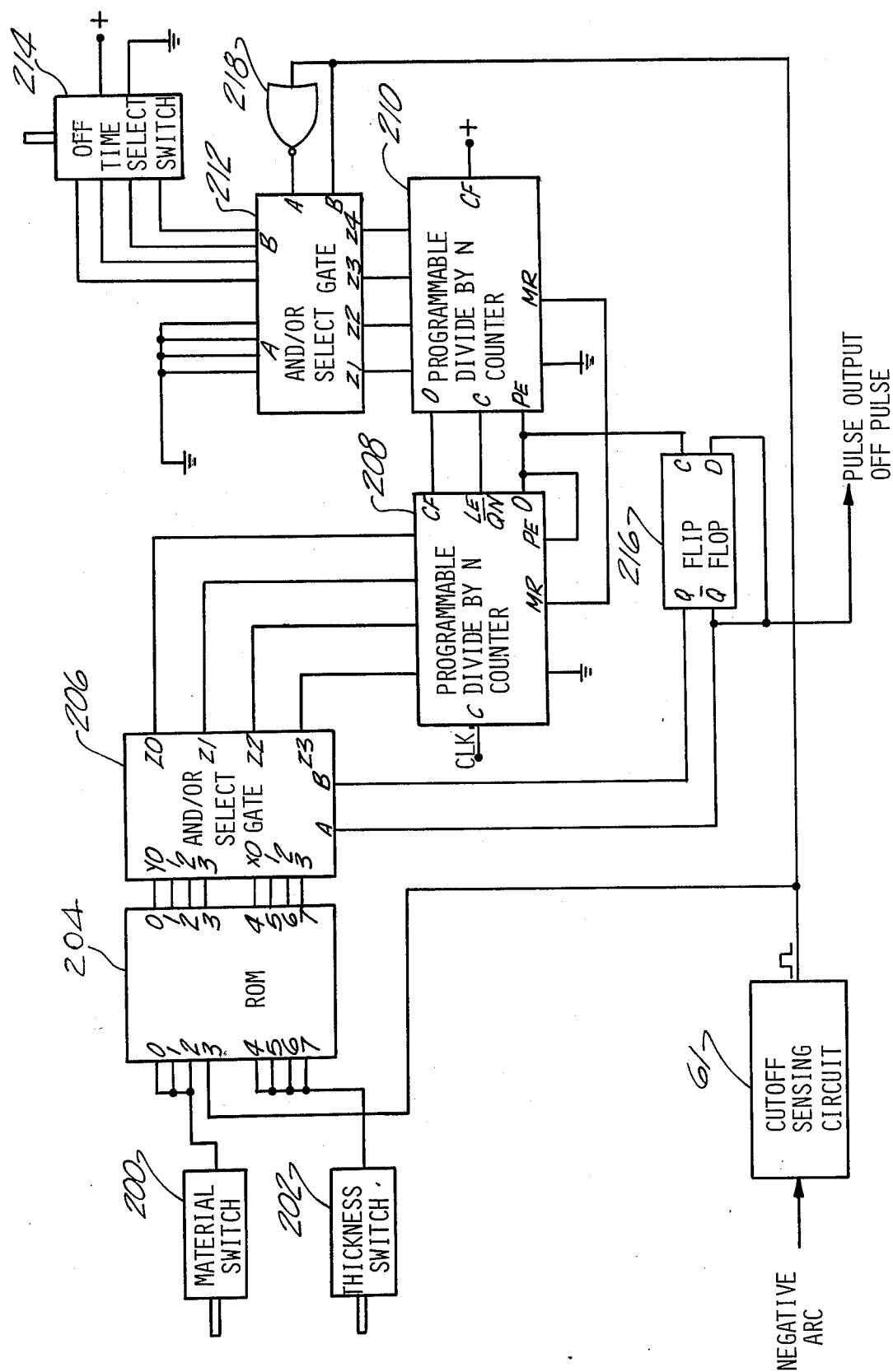
FIG. 4 is a block diagrammatic showing of the short circuit protection system according to the present invention.

FIG. 4 shows the basic components of the programmable off-time and short circuit protection system. These include at the left hand side of the drawing a material selection switch 200 and a thickness selection switch 202. The material switch 200 provides an input of the three-bit binary word to the next following read-only memory (ROM) 204. The thickness switch 202 provides an input to the ROM 204 which is a four-bit binary word and corresponds to the metal thickness. The ROM 204 looks at the combined seven-bit word input from the switches 200 and 202 and upon receipt of a one-bit word from the cut-off sensing network 61 is operable to send out two four-bit words to the next following stage which is and/or select gate. The and/or select gate 206 is a four-bit and/or select gate which operates to take the two four-bit words from the ROM 204 and from the control word on terminals A and B. The gate 206 and then outputs one of the two words to the next following stage 208. Stages 208 and 210 comprise programmable counters which are four-bit binary programmable counters wired as an eight-bit divide-by-N counter.

It will be seen that the counter 208 receives its four-bit word input from and/or select gate 206, while the counter 210 receives its four-bit word input from a different and/or select gate 212. The and/or select gate 212 is a four-bit and/or select gate having one four-bit input labeled as A and hard wired to produce a zero. The other four-bit word is derived from an additional programmable switch input from an off-time select switch 214. The switch 214 is embodied as a hexidecimal switch for generating a four-bit word input for the and/or select gate 212. Thus it is the function of the switch 214 to predetermine the off-time count during cut-off. As an example, for one particular combination of material and thickness, the cutting pulses might be reduced to one-fifteenth of the normal pulse duration.

The final part of the system comprises a D-type flip-flop 216 which takes the pulse output from the divide-by-N counters 208 and 210 and then generates a two-bit word for control lines A and B of the and/or select gate 206 to select the next divide-by-N number. Finally, it will be seen that the cut-off sensing circuit 61 receives its input from the negative gap terminal. When its output is high, it indicates a short circuit condition of the gap. An inverter stage 218 is further connected between the output of the cut-off sensing circuit 61 and the A input of the and/or select gate 212. The various terminals of counters 208 and 210 indicate a clock input and further indicate by initial the conventional preset enable PE, cascade feedbacks CF and master reset MR terminals.

The system in its preferred embodiment provides for seven different material possibilities and the proper off-time durations for each combination are prestored in the read-only memory 204. The read-only memory 204 is preferably of the programmable type in which a bit is in the logical zero storage stage established by a metal interconnection. By simply removing appropriate metal links on the device, the bits can be changed to the logical one state to meet the specific program requirements for the system.

It will thus be seen that we have provided by our invention a cut-off protection circuit based on digital logic and operable in a precise and predictable fashion, taking into consideration the important factors of material and thickness of the workpiece.

We claim as our invention:

1. In an electrical discharge machining apparatus of the digital type:
   a system for controlling machining power pulse on-time and off-time, including an on-time generator and an off-time generator;
   means for preprogramming the time of operation of the off-time generator as a function of the workpiece material and workpiece thickness;
   means for presetting the factor by which the off-time will be increased during gap short circuit condition;
   short circuit sensing means for providing a control signal representative of gap short circuit condition; and
   gating means for receiving said control signal and for providing the preprogrammed off-time duration during normal operation and for providing the increased off-time operation during gap short circuit condition.

2. The combination as set forth in claim 1 wherein said off-time is preprogrammed through a first switch input to provide data input relative to material being used and a second data input switch for providing data representative of workpiece thickness.

3. The combination as set forth in claim 2 wherein optimum off-time operation and the control of said off-time generator is provided through data prestored in a read-only memory, said read-only memory connected intermediate said switches and said gating means.

4. The combination as set forth in claim 3 wherein said gating means comprises a pair of and/or select gates, one intermediate the means for presetting the off-time during gap short circuit and the off-time generator and the other intermediate said read-only memory and the off-time generator.

5. The combination as set forth in claim 1 wherein there is further included in said off-time generator a counter of the divide-by-N type, such counter having its inputs derived from one of said gates respectively and its control output provided by a flip-flop, and wherein a feedback is provided to control the next divide-by-N operation of said counter.

6. In an electrical discharge machining apparatus including an electronic output switch and a power supply operatively connected to a machining gap for providing machining power pulses of predetermined on-off time duration thereto, a digital type machining power pulse circuit including a source of periodic clock pulses, an on-time generator and an off-time generator, means for presetting the time of operation of the off-time generator comprising:
   a first and second switch means settable to provide material and size input data respectively;
   a read-only memory operatively connected to the output of said switches and effective to provide optimum data output representative of optimum off-time for the settings of said switches; and
   means operatively connected to the gap for initiating the operation of the on and off-time generators in accordance with each gap breakdown.

7. The combination as set forth in claim 6 wherein there is further connected between said read-only memory and said off-time generator a gating means for disabling the output of said read-only memory and increasing the time of operation of said off-time generator responsive to a signal from the gap representative of gap short circuit condition.

8. The combination as set forth in claim 7 wherein said off-time generator comprises a programmable divide-by-N counter having its inputs connectible to the output of said gating means and to a separate off-time divide-by-N selector switch which is preset in accordance with the reduction of the number of machining power pulses desired during gap short circuit condition.

9. The combination as set forth in claim 6 wherein there is connected to the outputs of said divide-by-N counter a flip-flop stage used to control through its outputs the selection of each subsequent divide-by-N operation.

* * * * *

UNITED STATES PATENT AND TRADEMARK OFFICE
CERTIFICATE OF CORRECTION

PATENT NO. : 4,078,163
DATED : March 7, 1978
INVENTOR(S) : Oliver A. Bell, Jr. & Randall C. Gilleland It is certified that error appears in the above-identified patent and that said Letters Patent are hereby corrected as shown below:

On page 1

After "[75] Inventor: Oliver A Bell, Jr. & Randall C. Gilleland "

Insert--[73] Assignee: Colt Industries Operating Corp New York, N.Y.--

After "Primary Examiner—Bruce A. Reynolds"

Insert--Attorney, Agent, or Firm—Harry R. Dumont--

Signed and Sealed this

Tenth Day of October 1978

[SEAL]

Attest:

RUTH C. MASON
Attesting Officer

DONALD W. BANNER
Commissioner of Patents and Trademarks